(12) United States Patent
Suzuki et al.

(10) Patent No.: US 6,932,681 B2
(45) Date of Patent: Aug. 23, 2005

(54) CLEANING METHOD AND CLEANING DEVICE FOR FLUID DYNAMIC BEARINGS COMPONENT

(75) Inventors: Kesao Suzuki, Miyota-Machi (JP); Noriyuki Yoshimura, Miyota-Machi (JP)

(73) Assignee: Minebea Co., Ltd., Nagano (JP)

( * ) Notice: Subject to any disclaimer, the term of this patent is extended or adjusted under 35 U.S.C. 154(b) by 104 days.

(21) Appl. No.: 10/340,345

(22) Filed: Jan. 10, 2003

(65) Prior Publication Data

US 2003/0136427 A1 Jul. 24, 2003

(30) Foreign Application Priority Data

Jan. 21, 2002 (JP) ........................................ 2002-011529

(51) Int. Cl.⁷ ................................................ B24C 3/32
(52) U.S. Cl. ........................ 451/76; 239/225.1; 451/38; 451/51; 451/52; 451/81; 451/82
(58) Field of Search ................................ 239/97, 225.1, 239/227, 722; 451/52, 76, 38, 39, 40, 51, 42, 60, 80, 81, 82, 84, 87, 88, 331; 134/7, 32, 168 C, 167 C, 169 C, 103.3, 22.1, 22.11, 22.12, 22.13, 22.14

(56) References Cited

U.S. PATENT DOCUMENTS

| | | | |
|---|---|---|---|
| 4,456,037 A | * | 6/1984 | Gocho .......................... 141/1 |
| 4,727,619 A | * | 3/1988 | Robbins ....................... 15/304 |
| 5,024,561 A | * | 6/1991 | Kitagawa .................... 406/173 |
| 6,655,393 B2 | * | 12/2003 | Loughmiller ............ 134/22.12 |
| 6,694,991 B1 | * | 2/2004 | Mizuno et al. ............. 134/147 |

FOREIGN PATENT DOCUMENTS

WO WO99/47279 * 9/1999

* cited by examiner

*Primary Examiner*—Timothy V. Eley
(74) *Attorney, Agent, or Firm*—Joel Lutzker; Anna Vishev; Schulte Roth & Zabel

(57) ABSTRACT

The present invention provides a method and device for cleaning the oxide layer created on the bearing surface of a fluid dynamic bearing by the electrochemical machining of pressure generating grooves onto the bearing surface, wherein the method involves spraying a high-pressure liquid jet onto the bearing surface and the cleaning device is an apparatus for spraying a high-pressure liquid jet onto the bearing surface.

5 Claims, 5 Drawing Sheets

PRIOR ART

FIG. 7
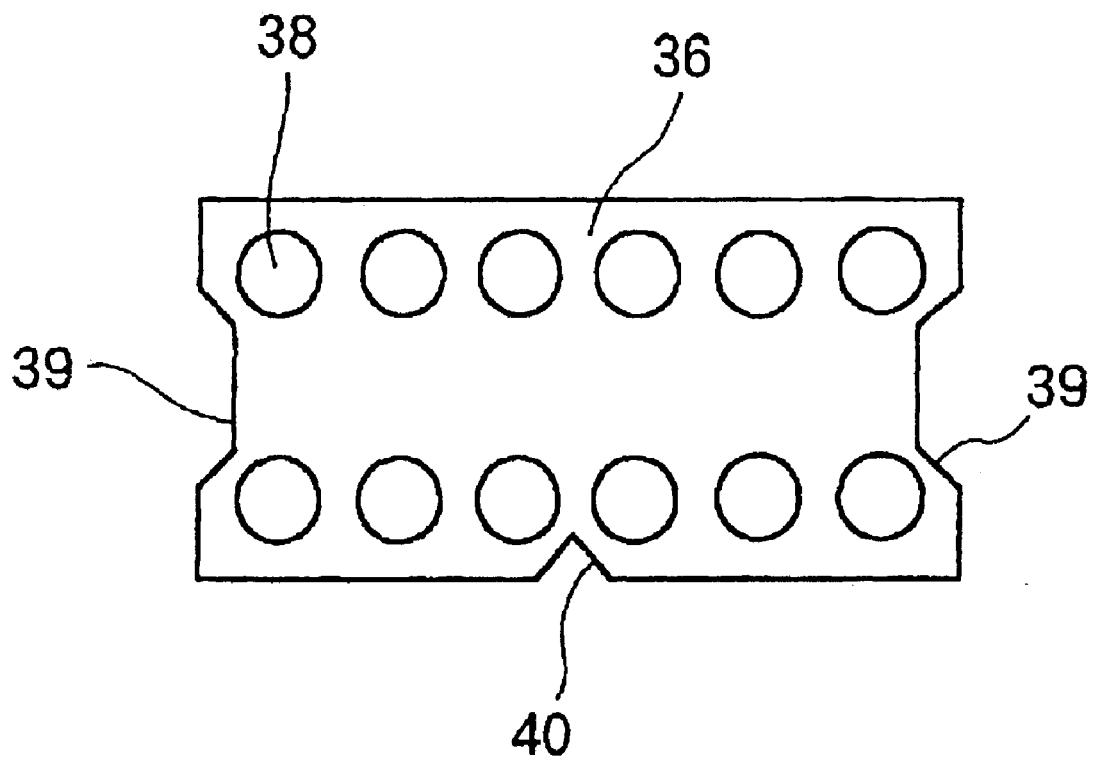
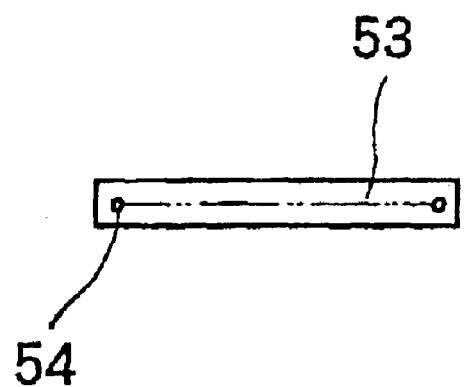
FIG. 8

CLEANING METHOD AND CLEANING DEVICE FOR FLUID DYNAMIC BEARINGS COMPONENT

This application claims priority from (Japanese) Patent Application No. 2002-011529 filed on Jan. 21, 2002.

BACKGROUND OF THE INVENTION

This invention relates to a method and a device for cleaning fluid dynamic pressure bearings.

In order to satisfy the increasing information density and the increasing rotational speeds of the magnetic disks used by computer hard disk drives, there exists a need for high rotational accuracy, low friction, low noise and long life bearings for the spindle motors that drive the magnetic disks. Accordingly fluid dynamic bearings have been developed for use with such spindle motors.

Fluid dynamic bearings operate by generating a dynamic pressure in a fluid contained between the spindle motor's shaft and the sleeve that supports the shaft. This pressure is generated by dynamic pressure generating grooves, which are formed on one or more or the bearing surfaces such as the sleeve or the shaft. These dynamic pressure generating grooves are shaped so as to generate a dynamic pressure when the shaft or the sleeve rotates and they have a depth of several microns. The dynamic pressure generated by the fluid allows the shaft to be supported in a non-contact state without mechanical friction. Accordingly, fluid dynamic bearings are able to achieve high rotational speed, low friction, low noise and long life.

Although other materials can be used, the shaft and the sleeve of fluid dynamic pressure bearings are often made from stainless steel. Finishing work on the bearing, cutting and polishing, creates a mirror-like bearing surfaces on the sleeve and the shaft. Dynamic pressure generating grooves are then be formed on the bearing surfaces of the sleeve or the shaft by electrochemical machining (ECM).

As a result of the electrochemical machining used to form the dynamic pressure grooves on the fluid dynamic pressure bearing, a hard oxide film is generated on the surface of the electrochemical machined grooves portion of the bearing. Since the clearance between the sleeve and the shaft is very small, if this oxide film comes loose from the sleeve during use, it can become wedged into the clearance between the sleeve and the shaft, the friction caused thereby can cause rotational irregularities and deficiencies due to adhesion and the like.

Conventionally, the oxide film generated by ECM is removed prior to the bearing's use by having an operator manually rub the bearing surface with a brush to which an abrasive material such as toothpaste or the like has been applied, or it is removed with an electric drill or the like furnished with a brush to which an abrasive material has been applied. Accordingly, removing the oxide film is an extremely difficult, inconsistent, labor intensive process that substantially impacts upon the quality of fluid dynamic bearings. Additionally, after the oxide film has been removed, it is necessary to wash off the abrasive material resulting in an additional manufacturing cost. Furthermore, the work must be done with scrupulous care to avoid damaging the bearing surface, since irregularities or the like can easily occur during the brushing and or the washing process.

SUMMARY OF THE INVENTION

It is therefore an object of the present invention to provide a cleaning method and a cleaning device for fluid dynamic pressure bearings that allows the easy and efficient removal of the oxide film that is generated by electrochemical machining of the dynamic pressure generating grooves on a fluid dynamic pressure bearing.

In order to solve the aforementioned problems, one aspect of the present invention is a cleaning method designed to remove the oxide film generated when electrochemical machining of dynamic pressure grooves on the bearing surface of a fluid dynamic pressure bearing is conducted. This method is characterized by removing the oxide film from the electrochemical machined grooves portion of the surface by spraying a high-pressured liquid jet onto the bearing surface. This method makes it possible to remove the oxide film produced by electrochemical machining without damaging the bearing surface. Additionally, this method pre-removes undesirable protrusions and burrs, which are caused by mechanical machining.

Another aspect of the present invention is to use deionized pure water for the high-pressured liquid jet. The use of deionized pure water eliminates the need for subsequently washing off the abrasives or cleaning agents, which are used in brush polishing. Moreover, when deionized pure water is used, there is no occurrence of scaling, corrosion or blockages in the high-pressure liquid jet nozzle and the high-pressure tubing resulting from the various impurities contained in tap water or the like.

Another aspect of the present invention is to use water mixed with abrasives and surfactants for the high-pressure liquid jet. The use of abrasives and surfactants makes it possible to effectively remove the protrusion, burrs and other byproducts of mechanical machining.

Another aspect of the present invention is a cleaning device designed to remove the oxide film generated when electrochemical machining of the dynamic pressure grooves on the bearing surface of the fluid dynamic pressure bearing is conducted. This device removes the oxide film by spraying a high-pressured liquid jet onto the bearing surface. Additionally, this device makes it possible to remove other foreign matter such as protrusions and burrs produced by mechanical machining. The cleaning device can be used with either deionized pure water or it can be used with water and an abrasive or surfacant.

BRIEF DESCRIPTION OF THE DRAWINGS

The invention is illustrated by way of example and not limitation and the figures of the accompanying drawings in which like references denote like or corresponding parts, and in which:

FIG. 7 is a plane view of the jig that holds the sleeves that are cleaned by the device shown in FIG. 6.

FIG. 8 is a plane view of the jig that supports the counter-plates that are cleaned by the device shown in FIG. 6.

DETAILED DESCRIPTION

Figure 1:
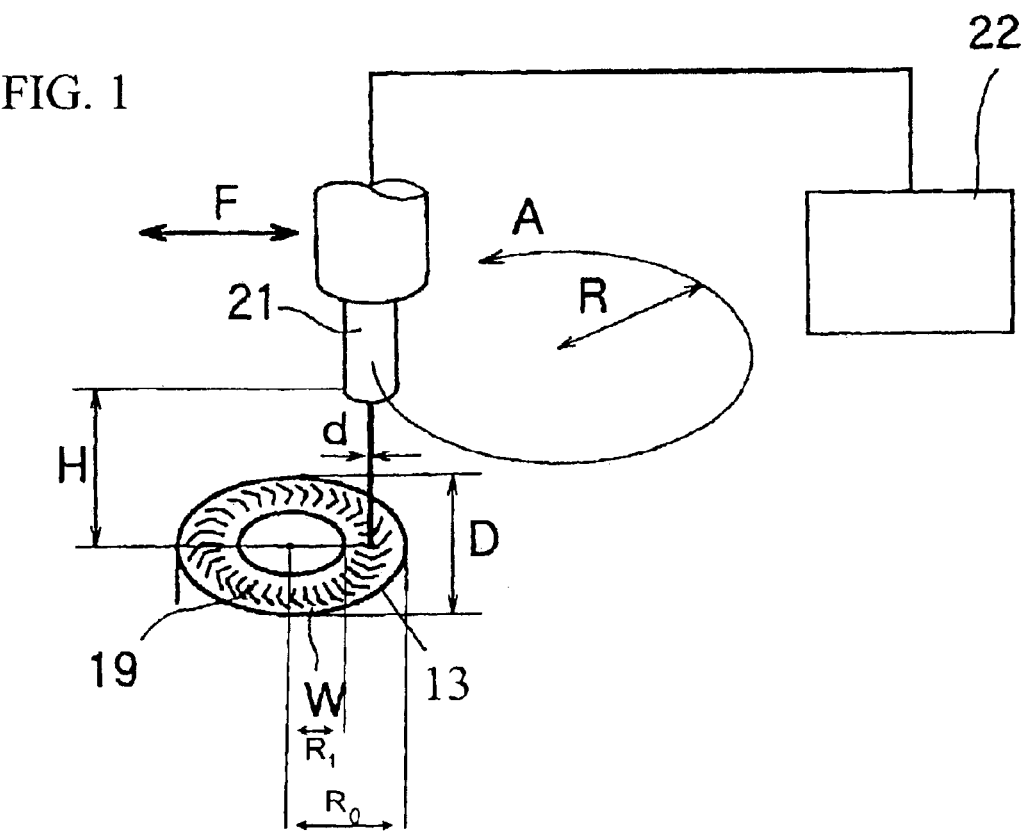
FIG. 1 is an explanatory view showing the cleaning method of the first embodiment of this invention.
Figure 2:
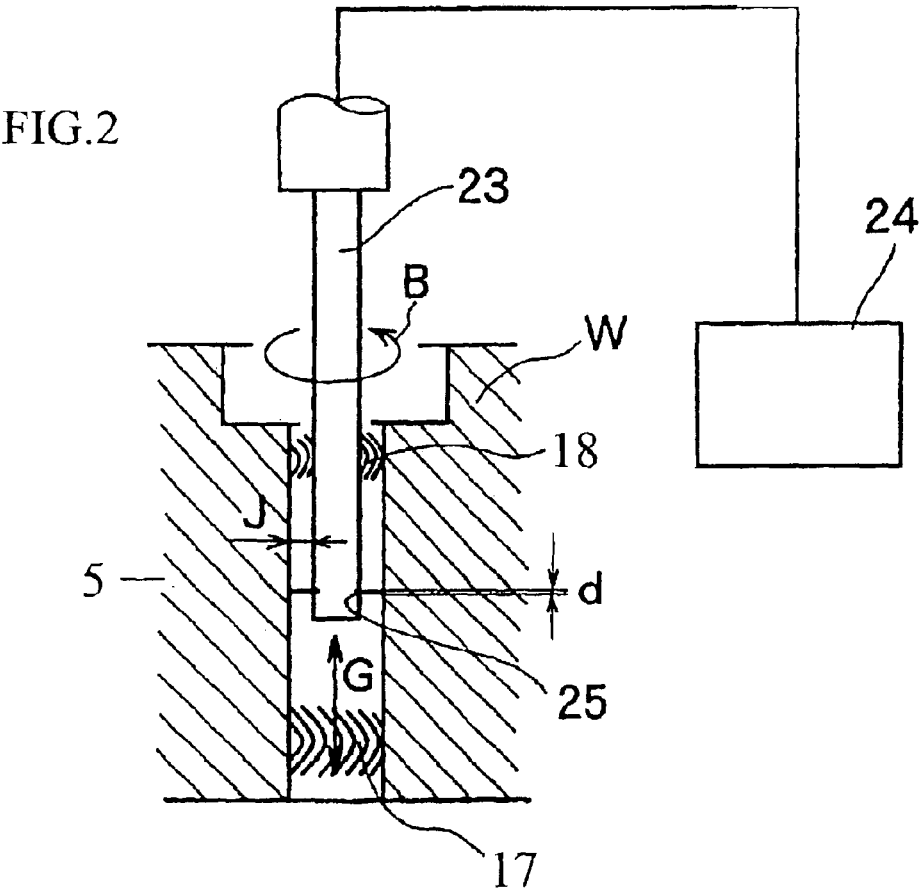
FIG. 2 is an explanatory view showing the cleaning method of the second embodiment of this invention.

Two embodiments of the present invention are shown in FIGS. 1 and 2, and they are described hereunder by reference to FIGS. 1–5.

Figure 3:
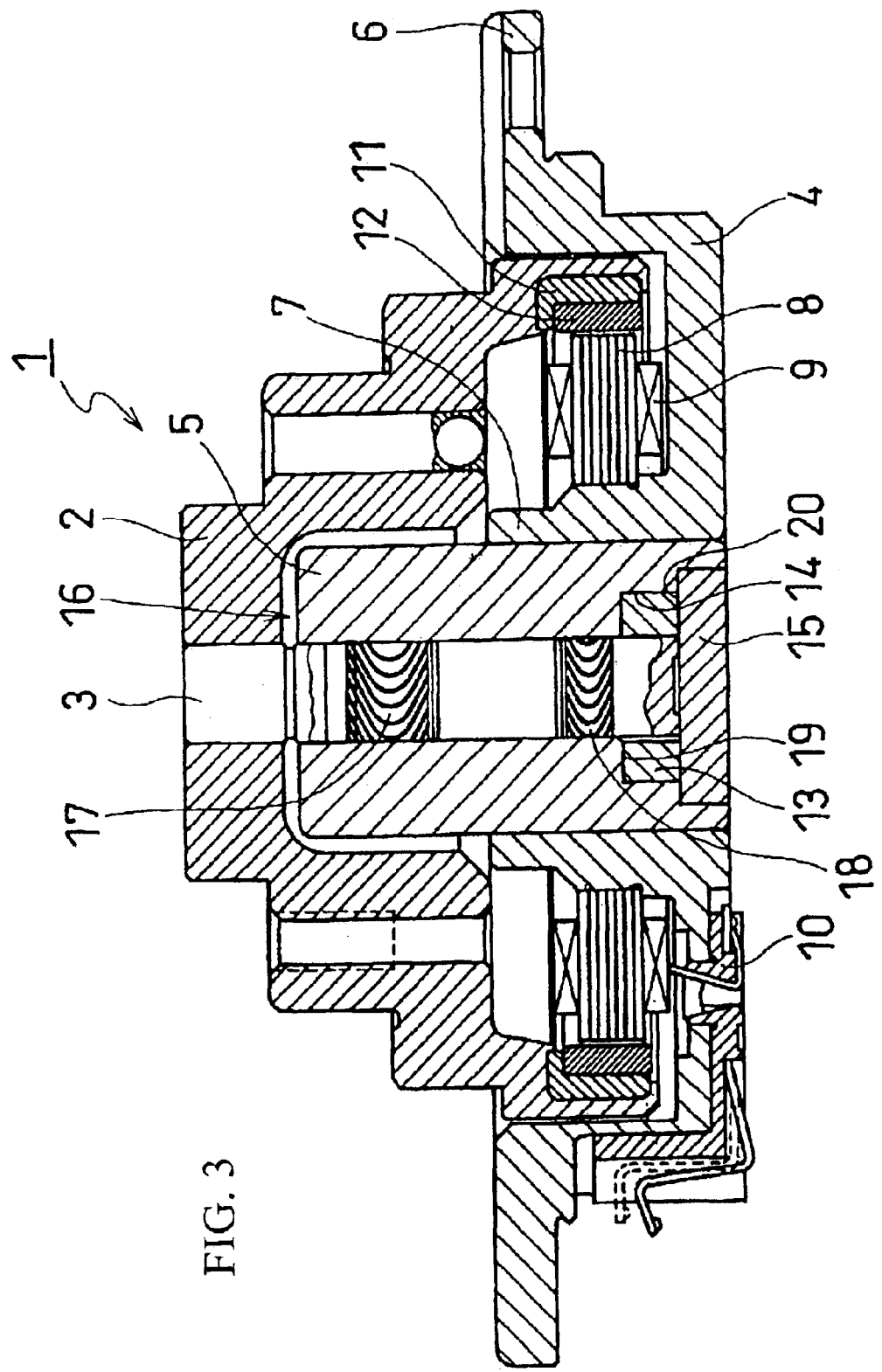
FIG. 3 is a longitudinal cross-sectional view of a conventional spindle motor provided with a fluid dynamic pressure bearing.
Figure 4:
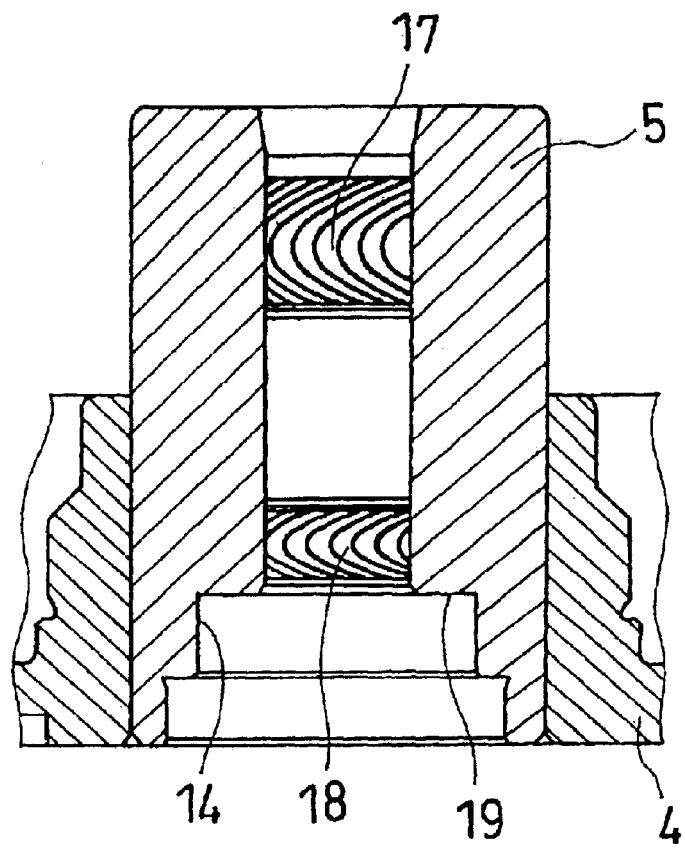
FIG. 4 is an enlarged view of a sleeve composing the fluid dynamic pressure bearing in the conventional spindle motor shown in FIG. 3.
Figure 5:
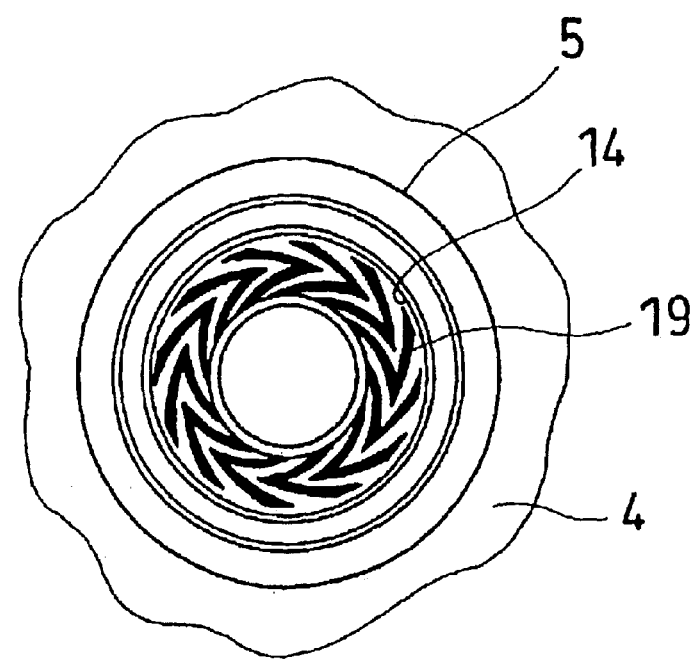
FIG. 5 is a bottom view of the sleeve shown in FIG. 4.

FIG. 3 shows a spindle motor containing a fluid dynamic bearing. The fluid dynamic bearing is comprised of shaft 3, sleeve 5, thrust-plate 13, which is affixed to the shaft, counter-plate 15, which is affixed to the sleeve, and pressure generating grooves 17, 18, 19, and 20. As shown in FIGS. 3, 4, and 5, the pressure generating grooves can be placed on either the shaft components or the sleeve components of the fluid dynamic bearing.

Shaft 3, sleeve 5, thrust-plate 13, and counter-plate 15 are generally made from stainless steel. Bearing surfaces are formed on shaft 3, sleeve 5, thrust-plate 13, and counter-plate 15 by cutting and polishing the stainless steel to create a mirrored finish. Pressure generating grooves 17, 18, 19, and 20 are then formed by electrochemical machining of the mirror finished bearing surface.

A cleaning method according to the first embodiment of the present invention is shown in FIG. 1. A high pressure fluid is provided from fluid pump 22 to nozzle 21. Nozzle 21 sprays the high pressure fluid onto pressure generating grooves 19, which are formed on thrust-plate 13. The fluid spray from nozzle 21 has a diameter d equal to the injection mouth diameter of nozzle 21. The high pressure fluid spray removes the oxide film from the grooved surface of thrust plate 19.

The nozzle 21 is initially directed to spray the high pressure fluid at the far outer edge of thrust-plate 13, which is a distance $R_0$ from the axis of thrust-plate 13, where $R_0$ equals one half the diameter of thrust-plate 13 ($R_0=\frac{1}{2}D$). Nozzle 21 then revolves around thrust-plate 13 at a rotational speed A, which is measured in revolutions per second (rps). The radius of revolution R(t) is initially equal to $R_0$ (the distance from the axis of thrust-plate 13 to the far outer edge of thrust-plate 13). The radius of revolution R(t) then decreases at a constant rate F ("the moving speed") until R(t) is equal to the radius of the inner edge of thrust-plate 13 ($R(t)=R_1$). At this point, the cleaning can stop or the nozzle 21 can continue revolving and spraying high pressure fluid onto the grooved surface of thrust-plate 13 with the radius R(t) increasing at a constant rate F until R(t) is equal to $R_0$.

As described above, nozzle 21 has two cleaning cycles. During cycle 1, the radius of revolution R(t) is equal to the outer radius of thrust plate 13 $R_0$ minus the moving speed F multiplied by the time from the beginning of the cycle t ($R(t)=R_0-F*t$). During cycle 2, the radius of revolution R(t) is equal to the inner radius of thrust plate 13 $R_1$ plus the moving speed F multiplied by the time from the beginning of the cycle t ($R(t)=R_1+F*t$). The cleaning cycles can be repeated continuously as many times as desired.

Provided that the rotational speed A (RPS), the moving speed F (mm/s), and the injection mouth diameter d (mm) of nozzle 21 meet the relationship $F \div A \leq d$ then the entire surface of thrust-plate 13 will be cleaned without any gaps.

In this embodiment, deionized pure water is used for the high-pressure liquid jet, and the injection mouth diameter of the nozzle 21 is set at 0.25 mm, injection pressure is set to 700 kg/cm$^2$, and the distance between the nozzle 21 and the work W is set at 20–40 mm. The rotational speed A is 1000 rpm (16.67 rps) and the moving speed F is 2 to 5 mm/s. Nozzle 21 may be reciprocated one or more times. By this means, one can efficiently remove the oxide film. This method can also be used to clean the bearing surface on counter-plate 15, which contains grooves 20, and other similar bearing surfaces.

A cleaning method according to a second embodiment of the present invention is shown in FIG. 2. A high pressure fluid is provided from fluid pump 24 to nozzle 23. Nozzle 23 sprays the high pressure fluid onto the bearing surface of sleeve 5, which has pressure generating grooves 17 and 18 formed thereon. Nozzle 23 includes a pair of injection mouths 25, which are diametrically opposed to each other. The fluid spray from nozzle 23 has a diameter d equal to the diameter of injection mouths 25 of nozzle 23. The high pressure fluid spray removes the oxide film from the grooved surface of sleeve 5.

Nozzle 23 is positioned in the axial center of sleeve 5 and it rotates at a constant rotational speed B. Nozzle 23 moves up and down at a rate G ("the moving speed") within sleeve 5. Provided that the rotational speed B (rps), the moving speed G (mm/s), and the diameter d (mm) of injection mouths 25 meet the relationship $G \div 2B \leq d$ then the entire bearing surface of sleeve 5 will be cleaned without any gaps. However, if the process is reciprocated, the oxide film can be effectively removed even if there are gaps.

In this second embodiment, deionized pure water is used for the high-pressure liquid jet, and the diameter d of the injection mouth 25 of the nozzle 23 is set at 0.25 mm, the injection pressure is set to 700 kg/cm2, and the distance between the nozzle 23 and the work W is set at 0.5–1.0 mm. The rotational speed B is 3000 rpm (50 rps) and the moving speed G is 5 to 9 mm/s. Nozzle 23 may be reciprocated one or more times. By this means, one can efficiently remove the oxide film.

As shown in the first and second embodiment, by injecting a high-pressure liquid jet onto the bearing surface, the oxide film produced in electrochemical machining can be unfailingly removed without injury to the finished surface, and other minute foreign matter such as processed chips, bearded needles, and burrs, which are produced at the time of machining, can simultaneously be completely removed. Moreover, by using deionized pure water for the high-pressure liquid jet, there is no need to wash off any cleaning agents, abrasive agents, etc., and one can simplify the cleaning process. Consequently, the above embodiments make it possible to automate the cleaning process and greatly raise productivity by automation.

In addition to deionized pure water, one can also use municipal tap water, RO (reverse osmosis) water and the like for the high-pressure liquid jet, but it is preferable to use deionized deionized pure water from the standpoint of preventing blockages of impurities, scaling, corrosion, chemical reactions and the like due to the small diameter of the injection mouth of the nozzle. On the other hand, using water mixed with a surfactant and abrasive agents such as CRB ceramic powder, calcium carbonate, silicon, and high polymer resin granules as the high-pressure liquid jet aids in removing the fins, burrs and the like generated during machining.

Figure 6:
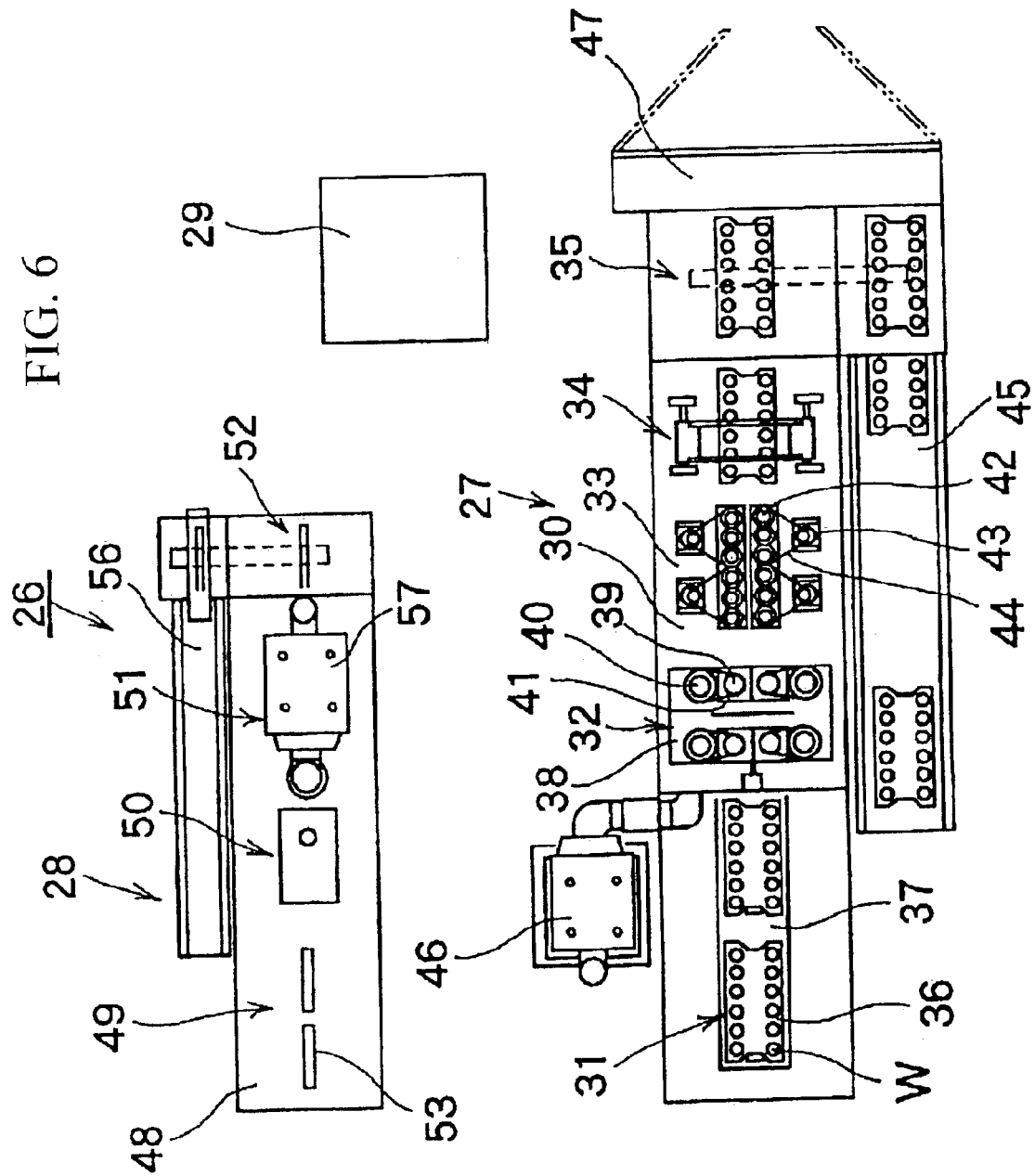
FIG. 6 is a layout view showing the third embodiment of this invention.

The third embodiment of the present invention is described by reference to FIGS. 6–8. As shown in FIG. 6, the cleaning device 26 is provided with a sleeve-cleaning device 27 for the purpose of cleaning the sleeve 5, a plate-cleaning device 28 for the purpose of cleaning the counter-plate 15 or the thrust-plate 13, and a deionized pure water-recycling device 29 for the purpose of recycling the deionized pure water supplied to sleeve-cleaning device 27 and plate-cleaning device 28.

As shown in FIG. 6, cleaning device 27 includes platform 30, on which are arranged input part 31, flat cleaning part 32, internal cleaning part 33, draining part 34, and discharge part 35. A conveyance device 37 is provided to sequentially move jig 36, which supports a plurality of works W (bearing surfaces that are to be cleaned), from the input part 31 to the flat cleaning part 32, to the internal cleaning part 33, to the draining part 34 and to the discharge part 35.

As shown in FIG. 7, the jig 36 is a roughly rectangular aluminum block, and it has multiple support holes 38 vertically formed in its support surface where the sleeves 5 (work W) are inserted and supported while attached to the base 4. The support holes 38 are arranged in two parallel rows with six holes each at equal intervals in a rectilinear manner, for a total of twelve holes. In the jig 36 are formed an engagement depression 39 for purposes of engaging the conveyance device 37 and a positioning depression 40 for purposes of positioning.

In the flat cleaning part 32, four rotary guns 39 are attached to the feed bar 38. The four rotary guns 39 are arranged at the front, back, right and left on the support surface of the jig 36 that is moved from the input part 31 and positioned by the conveyance device 37. Each rotary gun 39 corresponds to the three works W on the jig 36. Each rotary gun 39 is equipped with a nozzle (not illustrated) facing the work W, and this nozzle is connected to a high-pressure generating device (not illustrated) that supplies deionized pure water at high pressure. The rotary guns 39 are rotated at the specified rotational speed via the belt 41 by the motor 40, and the feed bar 38 is moved at the specified feeding speed, with the result that a high-pressure liquid jet (deionized pure water) is injected by the method shown in FIG. 1 onto the work W while the nozzle is moving.

The internal cleaning part 33 is provided with 12 rotary guns 42 facing the work W on the jig 36 that is moved from the flat cleaning part 32 and positioned by the conveyance device 37. Each rotary gun 42 is equipped with a nozzle (not illustrated) possessing an injection mouth on the side face that is inserted into the work W (sleeve 5), and this nozzle is connected to a high-pressure generating device (not illustrated) that supplies deionized pure water at high pressure. With regard to the rotary guns 42, three guns neighboring one another are rotated by one motor 43 via the belt 44 so that four motors 43 rotate the total of twelve rotary guns 42. The rotary guns 42 are attached to the feed bar (not illustrated), and can be moved in the axial direction. The rotary guns 42 are rotated at the specified rotational speed, and are moved in the axial direction at the specified feeding speed, with the result that a high-pressure liquid jet (deionized pure water) is injected by the method shown in FIG. 2 onto the work W while the nozzle is moving.

The draining part 34 conducts draining and accelerates drying by air-blowing the work W on the jig 36 that has been moved from the internal cleaning part 33 by the conveyance device 37. The discharge part 35 sends the jig 36, which has been moved from the draining part 34 by the conveyance device 37, to the roller conveyor 45 and discharges it to the specified position by the roller conveyor 45.

The deionized pure water recycling device 29 recycles the cleaning water that has been drained from the flat cleaning part 32, the internal cleaning part 33 and the draining part 34 after cleaning of the work, regenerates the deionized pure water level by activated carbon, ionic exchange and the like, and recirculates it to the high pressure generating device.

As shown in FIG. 6 centrifugal mist treatment device 46 attracts and conducts purification treatment of the spray, mist and the like of the cleaning water produced by the flat cleaning part 32, internal cleaning part 33 and draining part 34. Reference number 47 is the control panel that serves to control the flat cleaning part 32, internal cleaning part 33, draining part 34, conveyance device 37, deionized pure water recycling device 29 and mist treatment device 46.

When the work W is put on the jig 36 and introduced to the input part 31, the jig 36 is sequentially moved by the conveyance device 37. The end face of the large bore part 14 of the sleeve 5 is cleaned by the flat cleaning part 32, the inner periphery of the sleeve 5 is cleaned by the internal cleaning part 33, and, after draining by the draining part 34, discharge of the jig 36 is conducted from the discharge part 35. In this manner, the oxide film and foreign matter produced by electrochemical machining on the bearing surface of the sleeve 5 can be automatically removed and cleaned and productivity can be greatly improved.

Plate cleaning device 28 includes platform 48, on which are arranged input part 49, cleaning part 50, draining part 51 and discharge part 52 in this order. The jig 53, which holds the work W that is introduced at the input part 49, is sequentially moved to the cleaning part 50, draining part 51, and discharge part 52 by the conveyance device (not illustrated).

As shown in FIG. 8, jig 53 includes twenty-five support holes 54 (only the two holes at the two ends are illustrated) arranged on the support surface in one row at equal intervals into which the counter-plate is inserted and supported.

The cleaning part 50 is preferably provided with only one rotary gun 55, which is similar to the cleaning part 32 of the sleeve-cleaning device 27. The jig 53 is moved at the specified feeding speed by the conveyance device and the nozzle (not illustrated) is rotated at the specified rotational speed. Accordingly, a high-pressure liquid jet (deionized pure water) is injected by the method shown in FIG. 2 onto the work W, which is held by jig 53 while the nozzle is moving.

The draining part 51 conducts draining and accelerates drying by air-blowing the work W, which is held on the jig 53, that has been moved from the cleaning part 50 by the conveyance device.

The discharge part 52 sends the jig 53 that has been moved from the draining part 51 by the conveyance device to the roller conveyor 56 and it discharges the jig to the specified position by the roller conveyor 56.

The plate cleaning device 28 is provided with a centrifugal mist treatment device 57 that attracts and purifies the spray, mist and the like produced by the cleaning part 50 and draining part 51. Moreover, the cleaning water that is discharged from the cleaning part 50 and draining part 51 is recycled and treated by the deionized pure water-recycling device 29 in the same way as the aforementioned sleeve-cleaning device 27.

In this third embodiment, a work W is put on jig 53 at the input part 49, the jig 53 is sequentially moved by the conveyance device, is cleaned by the cleaning part 50, and drained by the draining part 51, after which discharge is conducted from the discharge part 52. In this manner, the oxide film and foreign matter produced by electrochemical machining on the bearing surface of the counter-plate 15 can be automatically removed and cleaned.

Through the use of this third embodiment, it is simultaneously possible to remove the oxide film produced by electrochemical machining of the dynamic pressure grooves without injury to the bearing surface, and also to unfailingly remove foreign matter such as fins and burrs caused by machining, thereby allowing obtainment of a clean bearing surface. By this means of applying a high-pressure liquid jet, it becomes possible to automate the cleaning process for dynamic pressure bearings, and to greatly improve productivity.

Furthermore, by using deionized pure water for the high-pressure liquid jet, not only is the oxide film and foreign matter such as fins and burrs removed by the high-pressure liquid jet, but also as adequate cleaning is able to be conducted with the deionized pure water and there is no need for subsequently washing off abrasives, cleaning agents or the like, thereby, simplifying the cleaning process. Moreover, by using deionized pure water, there is no occurrence of scaling, corrosion or blockages in the high-pressure liquid jet nozzle and the high-pressure tubing resulting from the various impurities contained in municipal tap water or the like.

On the other hand, it is possible to effectively remove the fins, burrs and the like produced by mechanical machining through the use of water mixed with abrasives and surfactants for the high-pressure liquid jet.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or, to combine elements of the embodiments described here with other modifications or variations that are not expressly described. Many of those undescribed variations, modifications and variations are within the literal scope of the following claims, and others are equivalent.

What is claimed is:

1. A device for cleaning fluid dynamic bearings comprising:
   a means for holding a work piece having a bearing surface;
   a means for pressurizing a liquid;
   a means for directing said pressurized liquid onto the bearing surface;
   a means for spraying a high-pressure liquid jet onto the bearing surface;
   a means for revolving the liquid jet spray around the bearing surface; and
   a means for varying a radius of revolution of said liquid jet spray;
   wherein the rate at which the radius changes, as measured in mm/sec, divided by a speed of revolution, as measured in rotations per second, is less than or equal to a diameter of the liquid jet, as measured in mm.

2. A device for cleaning fluid dynamic bearings comprising:
   a jig;
   a conveyance device;
   a cleaning part configured to spray a pressurized liquid onto said fluid dynamic bearings;
   a means for revolving the liquid jet spray around the bearing surface;
   a means for varying the radius of revolution of the liquid jet spray; and
   a draining part;
   wherein the rate at which the radius changes, as measured in mm/sec, divided by a speed of revolution, as measured in rotations per second, is less than or equal to a diameter of the liquid jet spray, as measured in mm.

3. A device according to claim 2 further comprising:
   an input part;
   and a discharge part.

4. A device for cleaning fluid dynamic bearings comprising:
   a jig;
   a conveyance device;
   a flat cleaning part configured to spray a pressurized liquid jet onto a flat fluid dynamic bearing surface;
   an internal cleaning part configured to spray a pressurized liquid jet onto a cylindrical bearing surface;
   a means for revolving the liquid jet spray around the bearing surface; and
   a means for varying the radius of revolution of the liquid jet spray;
   wherein the rate at which the radius changes, as measured in mm/sec, divided by a speed of revolution, as measured in rotations per second, is less than or equal to a diameter of the liquid jet spray, as measured in mm.

5. A device according to claim 4 further comprising:
   a draining part.

* * * * *